(12) United States Patent  
Chen

(10) Patent No.: US 12,337,566 B2
(45) Date of Patent: Jun. 24, 2025

(54) METHOD FOR PROCESSING COLORED PATTERN ON SHOE MATERIAL

(71) Applicant: Guangdong Victory Technology Co., Ltd., Gungdong Province (CN)

(72) Inventor: Tongju Chen, Guangdong Province (CN)

( * ) Notice: Subject to any disclaimer, the term of this patent is extended or adjusted under 35 U.S.C. 154(b) by 145 days.

(21) Appl. No.: 18/079,015

(22) Filed: Dec. 12, 2022

(65) Prior Publication Data

US 2024/0190095 A1 Jun. 13, 2024

(51) Int. Cl.
| | | |
|---|---|---|
| *B29D 35/00* | (2010.01) | |
| *A43B 13/04* | (2006.01) | |
| *A43B 13/12* | (2006.01) | |
| *B29B 7/00* | (2006.01) | |
| *B29D 35/12* | (2010.01) | |
| *B29D 35/14* | (2010.01) | |

(52) U.S. Cl.
CPC .......... *B29D 35/0063* (2013.01); *A43B 13/04* (2013.01); *A43B 13/122* (2013.01); *B29B 7/005* (2013.01); *B29D 35/122* (2013.01); *B29D 35/142* (2013.01)

(58) Field of Classification Search
CPC .... A43B 13/04; A43B 13/122; B29D 35/142; B29D 35/122
See application file for complete search history.

(56) References Cited

U.S. PATENT DOCUMENTS

| | | | | |
|---|---|---|---|---|
| 1,498,986 | A * | 6/1924 | Banbury | B29B 7/7495 366/147 |
| 1,813,235 | A * | 7/1931 | Dunbar | B29D 35/142 264/293 |
| 2,575,378 | A * | 11/1951 | Bender | C14B 5/02 525/942 |
| 2,999,788 | A * | 9/1961 | Winthrop | D01D 5/11 162/146 |
| 4,034,847 | A * | 7/1977 | Takagi | B29B 7/7495 241/101.8 |
| 9,217,078 | B2 * | 12/2015 | Hoya | A43B 17/006 |
| 9,493,623 | B2 * | 11/2016 | Shimizu | A43B 13/04 |
| 10,179,850 | B2 * | 1/2019 | Kusanose | C08L 53/02 |
| 2004/0261297 | A1 * | 12/2004 | Park | B29D 35/0054 36/43 |
| 2006/0108708 | A1 * | 5/2006 | Wakita | B32B 27/34 156/308.2 |
| 2007/0122615 | A1 * | 5/2007 | Mutsuda | B32B 27/16 428/375 |
| 2008/0269366 | A1 * | 10/2008 | Shaffer | C08L 53/02 521/134 |

(Continued)

*Primary Examiner* — Emmanuel S Luk

(57) ABSTRACT

This disclosure relates to the technical field of shoe material processing, and in particular to a method for processing a colored pattern on a shoe outsole material. The colored pattern is printed on a fiber membrane, and the membrane material printed with the colored pattern and a manufactured rubber shoe material are then placed in a compression mold to combine them totally to achieve good quality. This disclosure can make any design pattern without limitation and effectively avoid paint peeling off and color migration issues. Moreover, as the processing process is implemented by compression molding, it causes no pollution and is environment-friendly.

3 Claims, 2 Drawing Sheets
(2 of 2 Drawing Sheet(s) Filed in Color)

(56) References Cited

U.S. PATENT DOCUMENTS

| | | | |
|---|---|---|---|
| 2010/0031535 A1* | 2/2010 | Leedy | B29C 43/021 |
| | | | 12/146 B |
| 2011/0258886 A1* | 10/2011 | Moon | A43B 13/22 |
| | | | 12/146 B |
| 2018/0118917 A1* | 5/2018 | Cohn | C07C 69/76 |
| 2019/0248938 A1* | 8/2019 | Kawasaki | C08K 3/22 |
| 2021/0292531 A1* | 9/2021 | Xu | C08L 23/286 |

* cited by examiner

METHOD FOR PROCESSING COLORED PATTERN ON SHOE MATERIAL

BACKGROUND OF THE INVENTION

This disclosure relates to the technical field of shoe material processing, and in particular to a method for processing a colored pattern on a shoe material.

With people's requirements for beautiful and personalized appearance of shoe products, shoes made of shoe materials printed with colors or patterns are provided to meet people's pursuit of high-quality shoe materials.

Currently in the market, when multicolor patterns are arranged on surfaces of rubber shoe materials, printing ink is sprayed or printed onto rubber outsole surface, and then a protective layer is applied to form the multicolor patterns, but the patterns prepared in this way have color mixing at edges and easily peel off after wearing for a long time, lead to low production quality. Moreover, this method will cause environmental pollution, which cannot meet the standard of environmental protection.

Therefore, a method for processing a multi-color pattern on a shoe material is desired to solve the problems of the prior art.

BRIEF SUMMARY OF THE INVENTION

In order to solve above problems, this disclosure provides a method for processing a colored pattern on a shoe material, with simpler processes, easier operation, one-time compression molding and deep combination of the pattern and rubber, which avoid quality problems such as paint peeling off, color migration and so on. Meanwhile, this method is environmentally friendly and has low processing cost.

The technical solution of this disclosure is as follows:

This disclosure relates to a method for processing a colored pattern on a shoe material, including following preparation steps:
- S1. manufacturing a rubber shoe material;
- S2. printing a colored pattern on membrane material;
- S3. placing the membrane material printed with the colored pattern and the rubber shoe material into a mold, and carrying out compression mold at temperature between 150° C. and 160° C. to fuse the membrane material into the rubber shoe material to form a molded rubber shoe material with the colored pattern in rubber.

Further, manufacturing the rubber shoe material in step S1 includes following specific steps:
- S11. preparing raw materials in proportion, then banburying and mixing the proportioned raw materials and then sheeting out;
- S12. carrying out ripening and remix in sequence; and
- S13. re-sheeting and cutting the remixed rubber material into a needed shape.

Further, before cutting in step S13, metal detection is performed on an obtained sheet.

Further, in step S2, the membrane material is a fiber membrane.

Further, in step S2, one-time compression molding is adopted.

Further, in step S2, the compression molding continues for 6-7 min.

Further, in step S2, the compression molding is carried out under a pressure of 140-160 kg/cm2.

Beneficial Effects of this Disclosure:

According to the processing method of this disclosure, the membrane material printed with the colored pattern and the manufactured rubber shoe material are molded by one-step molding. Since the colored pattern is totally combined with the rubber material through compression molding, so the quality of the molded shoe outsole is good. This disclosure can go with any design of colored pattern and effectively avoid paint peeling off and color migration issues. Moreover, this disclosure is implemented by compression molding, and it causes no pollution and is environment-friendly.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
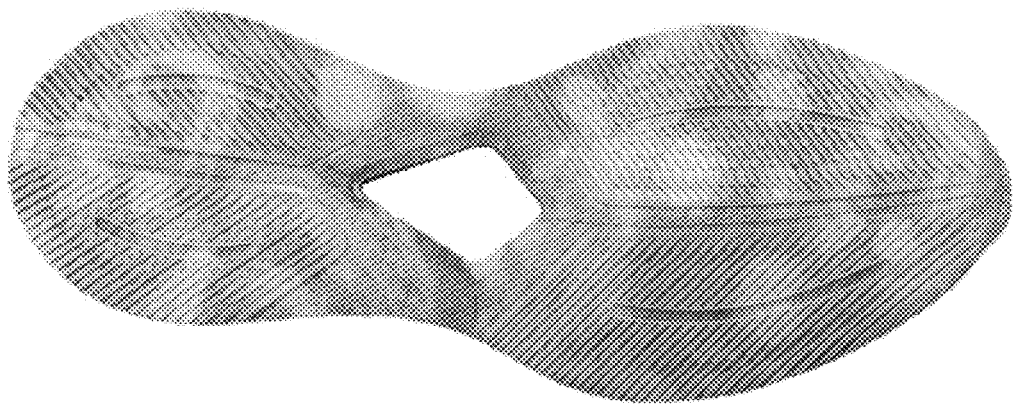
FIG. 1 is a diagram of a shoe material product processed according to Embodiment 1 of the present application.

For easy understanding of this disclosure, this disclosure will be more fully described as below with reference to embodiments, and preferred embodiments of this disclosure are given as below. However, this present invention may be implemented in many different forms and is not limited to the embodiments described herein. These embodiments are provided to make the content disclosed by this disclosure more thoroughly and comprehensively. Various materials used in the embodiments, unless otherwise indicated, are common commercial products.

Unless otherwise defined, all technical and scientific terms used herein have the same meaning as commonly understood by those skilled in the technical field to which this disclosure belongs. The terms used in the description of this disclosure are only for the purpose of describing specific embodiments but not intended to limit this disclosure. The term "and/or" as used herein includes any and all combinations of one or more of the associated listed items.

Numerical values disclosed in the embodiments of this disclosure are approximate values, not deterministic values. If allowance or experimental conditions permit, all values within an allowance range may be included and are not limited to specific values disclosed in the embodiments of this disclosure.

Numerical ranges disclosed in the embodiments of this disclosure are used to indicate relative contents of components in a mixture as well as ranges of temperature or other parameters set forth in other method embodiments.

The present application provides a method for processing a colored pattern on a shoe material, including the following preparation steps:
- S1. manufacturing a rubber shoe material;
- S2. printing a colored pattern on a membrane material;
- S3. placing the membrane material printed with the colored pattern and the rubber shoe material into a mold, and carrying out compression molding at a temperature between 150° C. and 160° C. to fuse the membrane material into the rubber shoe material to form a molded rubber shoe material with the colored pattern in rubber.

Manufacturing the rubber shoe material in Step S1 includes following specific steps:

S11. preparing raw materials in proportion, then banburying and mixing the proportioned raw materials and then sheeting out;

S12. carrying out ripening and remixing in sequence; and

S13. re-sheeting the remixed material, carrying out metal detection on an obtained sheet, and then cutting the sheet into a needed shape.

In step S2, the membrane material is a fiber cloth which can be fused into rubber at a high temperature.

In step S2, one-time compression molding is adopted.

In step S2, the compression molding continues for 6-7 min.

In step S2, the compression molding is carried out under a pressure of 140-160 kg/cm2.

According to the processing method of this disclosure, the membrane material printed with the colored pattern and the manufactured rubber shoe material are molded by one-step compression molding. Since the colored pattern is deeply combined with the rubber material through compression molding, so the quality of the molded piece is good. This disclosure can product with any design of pattern, effectively avoid paint peeling off and color migration issues. Moreover, as this disclosure is implemented by compression molding, it causes no pollution and is environment-friendly.

Specifically, in the embodiment, the colored pattern in the shoe material is processed through compression molding, so that the colored pattern is totally combined with the rubber material. The position of the colored pattern in the shoe material is equivalent to that of the "dermis layer" of human skin, that is, the colored pattern is processed in the rubber shoe material.

Specific Embodiments

Embodiment 1

A method for processing a colored pattern on a surface of a shoe material in this embodiment includes the following preparation steps:

S1. raw materials were prepared in proportion, the proportioned raw materials were banburyed by a 10,000-horsepower Banbury machine and mixed by a roller, and then sheeted out. The obtained sheet was ripened in a transferring bin, then remixed on a roller and re-sheeted out. Metal detection was carried out on the obtained sheet, and then the sheet was cut to form rubber soles.

S2. a colored pattern was printed on fiber cloth/membrane material.

S3. a fiber cloth printed with the colored pattern and the rubber shoe material were placed into a mold, and compression molded at temperature between 150° C. and 160° C. and mold pressure of 150 kg/cm2 for 6.5 min to fuse fiber cloth into the rubber shoe material to obtain a molded rubber shoe material with the colored pattern in rubber through one-time compression molding.

The ingredients in this embodiment are from conventional rubber formulations including main rubbers, fillers, oils, and auxiliary materials.

Specifically, rubber ingredients in this embodiment are from a formulation as shown in the table below:

| Raw materials | | PHR | Weight (G) |
|---|---|---|---|
| Main rubber | BR150 | 49.0 | 21000 |
| | IR-80 | 18.0 | 7500 |
| | EPDM | 25.0 | 10500 |
| | SSBR2003T | 8.0 | 3000 |
| Filler | 180P white carbon | 50.0 | 20000 |
| Oil | Naphthenic oil | 12.0 | 4800 |
| | HP669 | 2.5 | 1000 |
| Auxiliary material | SA1801 | 0.9 | 370 |
| | PEG4000 | 3 | 1200 |
| | BHT | 1.2 | 500 |
| | AKTIOL | 2.0 | 800 |
| | Zinc oxide Rs | 5.5 | 2255 |
| | RH150 resin | 1.0 | 400 |
| | 0H3-MG | 3.0 | 1230 |
| | RW159 | 0.9 | 370 |

Referring to FIG. 1, it shows the rubber shoe material with a colored pattern prepared in Embodiment 1.

Figure 2:
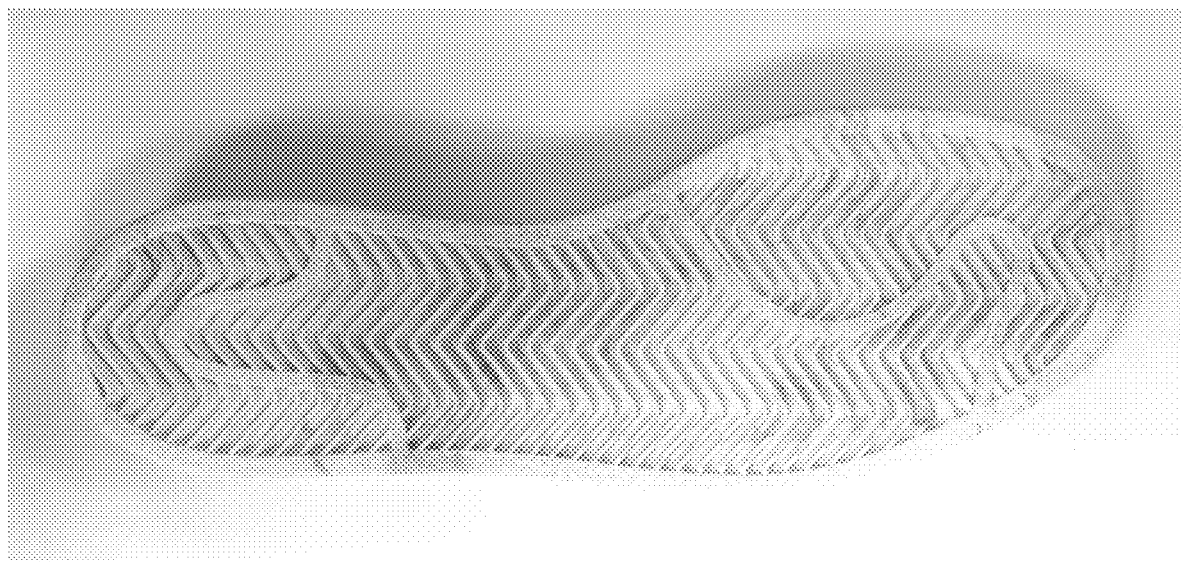
FIG. 2 is a diagram of a shoe material product processed according to Embodiment 2 of the present application.

FIG. 2 is Embodiment 2, and this embodiment is different from Embodiment 1 as different printed pattern on fiber cloth and outsole shape.

Figure 3:
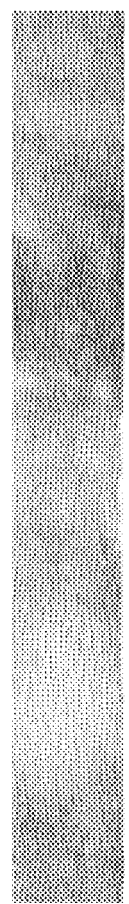
FIG. 3 is a diagram of a shoe material product processed according to Embodiment 3 of the present application.

FIG. 3 is Embodiment 3, and this embodiment is different from Embodiments 1 and 2 as different printed pattern on fiber cloth and outsole part. This embodiment is outsole taping.

The shoe materials with a colored pattern prepared in Embodiments 1 to 3 were done hydrolysis test and color migration test and so on. The test results are shown in the table below:

| Test item/ Embodiment | Test standard | Embodiment 1 | Embodiment 2 | Embodiment 3 |
|---|---|---|---|---|
| Appearance | Visual inspection | The pattern is clear | The pattern is clear | The pattern is clear |
| Hydrolysis test | UATMF02 | Not fade | Not fade | Not fade |
| Color fastness test | FT-11 | 4 | 4 | 4 |
| Abrasion test | Z | 70 | 71 | 70 |
| Tear strength test | ST-02 | 156 | 157 | 155 |

Above all, the processing method of this disclosure is feasible to make any design pattern with no limitation, simple processes and easy operation. Since fiber cloth with the colored pattern and the rubber material are compression molded together at one time, fiber cloth is fused into rubber and becomes invisible, but the colored pattern is totally fused into rubber surface. Contrast to spray painting on a rubber material with peeling off and color migration issues, the molded rubber material made according to this disclosure has good visual quality and no fading or color migration issues, meanwhile with good durability, anti-yellowing, anti-abrasion, and anti-tear strength abilities. The method of this disclosure causes no pollution and is environment-friendly.

The above embodiments only show several embodiments of this disclosure, which are more specific and detailed, but not to be construed as limiting the scope of this disclosure. It should be noted that those of ordinary skill in the art may further make variations and improvements without departing from the conception of this disclosure, and these all fall within the scope of this disclosure. Therefore, the scope of the patent for this disclosure shall be subjected to the appended claims.

What is claimed is:

1. A method for processing a colored pattern on a shoe material, comprising the following preparation steps:
   S1. manufacturing a rubber shoe material;
   S2. printing a colored pattern on a membrane material; and
   S3. placing the membrane material printed with the colored pattern and the rubber shoe material into a mold, and carrying out compression molding at a temperature between 150° C. and 160° C. to fuse the membrane material into the rubber shoe material to form a molded rubber shoe material with the colored pattern in rubber;
   wherein in step S2, the membrane material is a fiber membrane material:
   wherein in step S3, one-step compression molding is adopted and is carried out under a pressure of 140-160 kg/cm$^2$ for 6-7 min.

2. The method for processing a colored pattern on a shoe material according to claim 1, wherein manufacturing the rubber shoe material in step S1 comprises the following steps:
   S11. preparing raw materials in proportion, and then banburying and mixing the proportioned raw materials and then sheeting out;
   S12. carrying out ripening and remixing in sequence; and
   S13. re-sheeting and cutting the remixed material into a needed shape.

3. The method for processing a colored pattern on a shoe material according to claim 2, wherein before cutting in step S13, metal detection is performed on an obtained sheet.

* * * * *